UNITED STATES PATENT OFFICE.

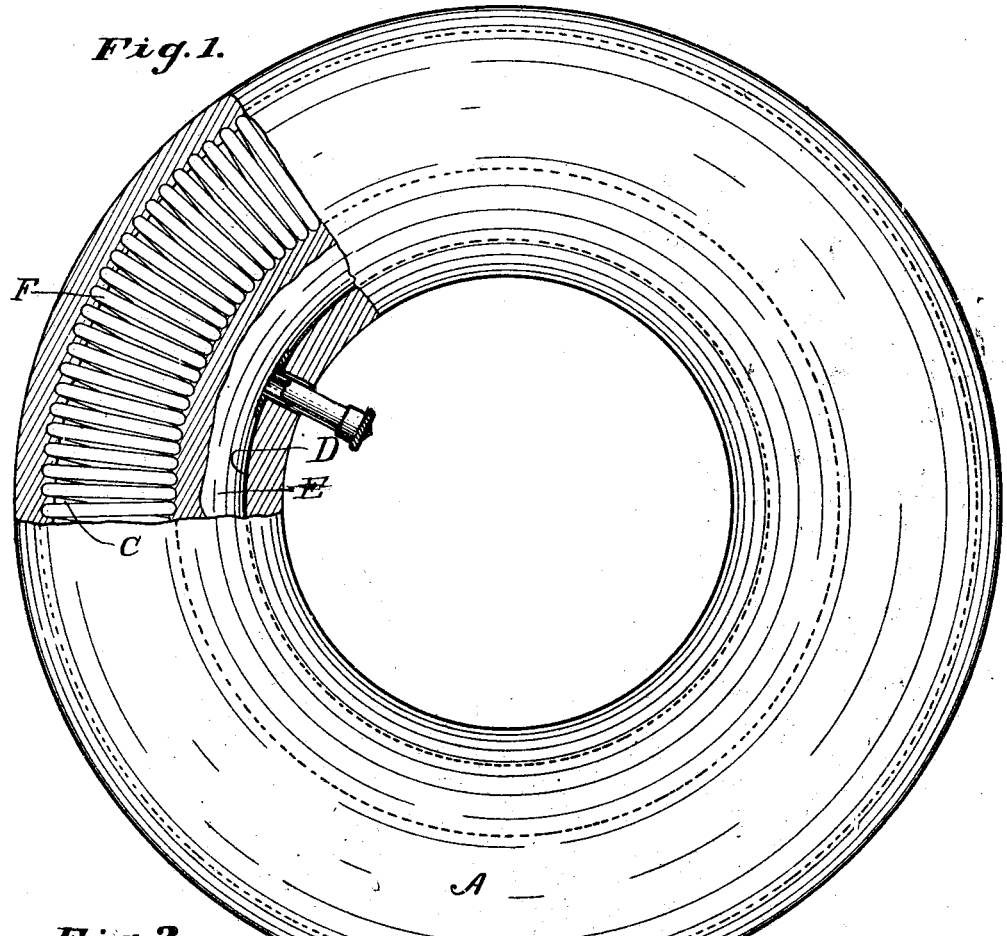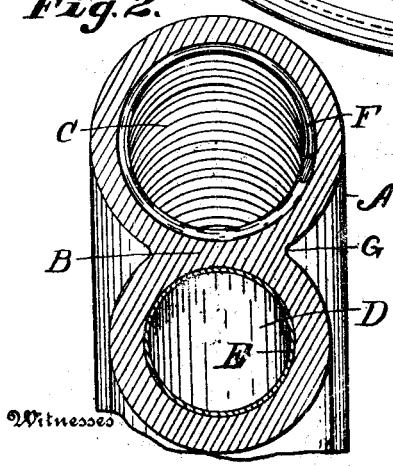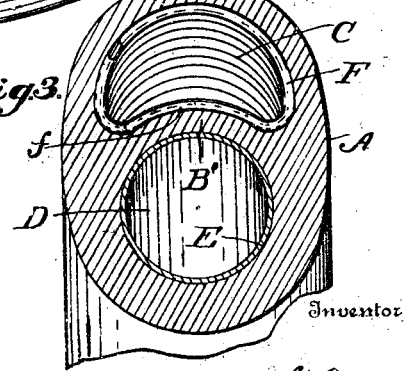

ANTON AEBLI, OF MILWAUKEE, WISCONSIN.

VEHICLE-TIRE.

1,033,513.  Specification of Letters Patent.  Patented July 23, 1912.

Application filed October 6, 1909. Serial No. 521,319.

*To all whom it may concern:*

Be it known that I, ANTON AEBLI, a citizen of the United States, residing at Milwaukee, in the county of Milwaukee and State of Wisconsin, have invented a new and useful Vehicle-Tire, of which the following is a specification.

My invention relates to improvements in vehicle tires.

The object of my invention is to provide a form of tire which will not collapse when punctured, although it may, if desired, contain an inflated pneumatic tube. Also to provide a form of tire in which the inflated portion will be protected by an outer portion having a cavity of larger transverse diameter than that of the inflated cavity,— the walls of the larger cavity being supported by a resilient non-collapsible member.

In the following description reference is had to the accompanying drawings, in which—

Figure 1 is a side elevation of my improved tire, partially broken away to show the interior construction. Fig. 2 is a cross sectional view of the same. Fig. 3 is a cross sectional view showing a modified form of construction.

Like parts are identified by the same reference characters throughout the several views.

The casing A of my improved tire is formed of rubber, or layers of rubber and canvas, or any other suitable flexible material. The space within this casing is subdivided by a wall B into two concentric annular cavities C and D respectively. The inner cavity D may be filled with compressed air. A flexible tube E is preferably inserted in the cavity D and inflated in the usual manner, but this is not essential. The outer cavity is filled with a resilient non-collapsible member, such as the spirally coiled spring F shown in Fig. 2, this coil having the form of a progressive spiral, with the successive turns in close proximity to each other. If desired, the inner wall of this coil may be buckled inwardly, forming an annular channel $f$ along the inner wall of the coil, which channel is concave in cross section as shown in Fig. 3. In such cases the partition wall B should be convex on the side against which the concave portion of the spring seats, thus conforming to the shape of this portion of the spring.

Where the spring retains the form of a cylindrical coil as shown in Fig. 2, the wall B will preferably extend straight across the space between the two cavities, and the outer casing A may with advantage be formed with annular insets G along the line of the partition B, the tire being thus made to assume in cross section, the shape of a figure 8.

In constructing my improved tire, the coiled spring is inserted in the mold, and embedded in the rubber of the casing and partition wall in the process of casting the tire.

It will be observed that the outer cavity C has a greater transverse diameter than the inner cavity E and this is true, not only of the construction illustrated in Fig. 2, but also of the construction illustrated in Fig. 3. It therefore follows that in case the tire becomes punctured into the inner cavity D, the escape of air from the latter will not permit the outer portion of the tire to settle into it, since the coiled spring will be supported by the walls of the tire on the respective sides of the cavity D.

In order to prevent the outer portion of the tire from settling into the inner cavity D, it is, of course, necessary that the walls of the outer cavity be supported so that they cannot collapse. For this reason it is not practical to depend upon pneumatic pressure to sustain the walls of the outer cavity, since such walls would necessarily be punctured first and the escape of air from the outer cavity would immediately render the tire useless whether the inner cavity were punctured or not, but by making the outer cavity larger than the inner one and supporting its walls so that they cannot collapse under any circumstances, I am able to secure the benefit of a pneumatic cushion when the inner tube is inflated, and can still use the tire as a spring cushion tire in case the inner tube is deflated.

Having thus described my invention, what I claim as new and desire to secure by Letters Patent, is—

1. A vehicle tire comprising a flexible sheath, having its interior portion subdivided by similar material into two concentric annular cavities, the inner cavity being adapted to receive air under pressure, and the outer cavity having a resilient non-collapsible member supporting the tread surface of said flexible sheath, said member comprising a metallic spring wound in the form of a progressive spiral coil filling the outer cavity, and having a greater transverse diameter than the transverse diameter of the inner cavity.

2. A vehicle tire comprising a flexible sheath, having its interior portion subdivided by similar material into two concentric annular cavities, the inner cavity being adapted to receive air under pressure, and the outer cavity having a resilient non-collapsible member supporting the tread surface of said flexible sheath, said member comprising a metallic spring wound in the form of a progressive spiral coil filling the outer cavity, the inner side of said spiral coil being buckled inwardly in concave bends, said coil having a greater transverse diameter than that of the inner cavity.

In testimony whereof I affix my signature in the presence of two witnesses.

ANTON AEBLI.

Witnesses:
MARY COLLINGE,
DOM. R. FRYMARK.